March 14, 1950     B. F. PARR     2,500,767
ELECTRIC TOASTER
Filed Feb. 6, 1945     2 Sheets-Sheet 1
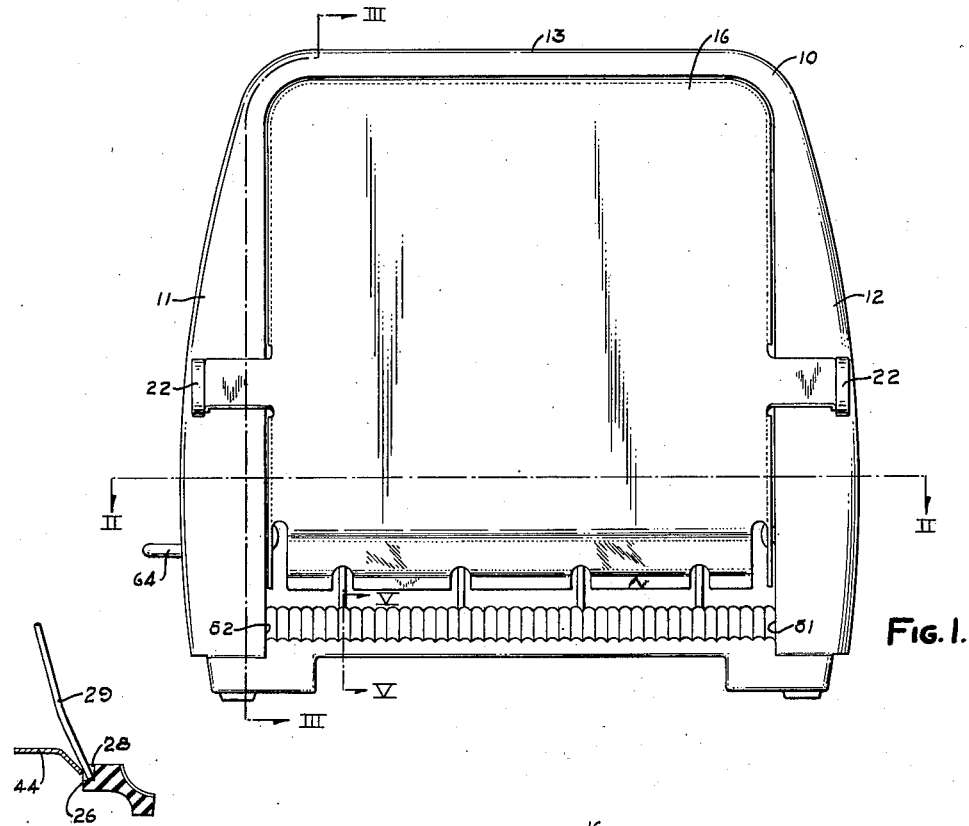
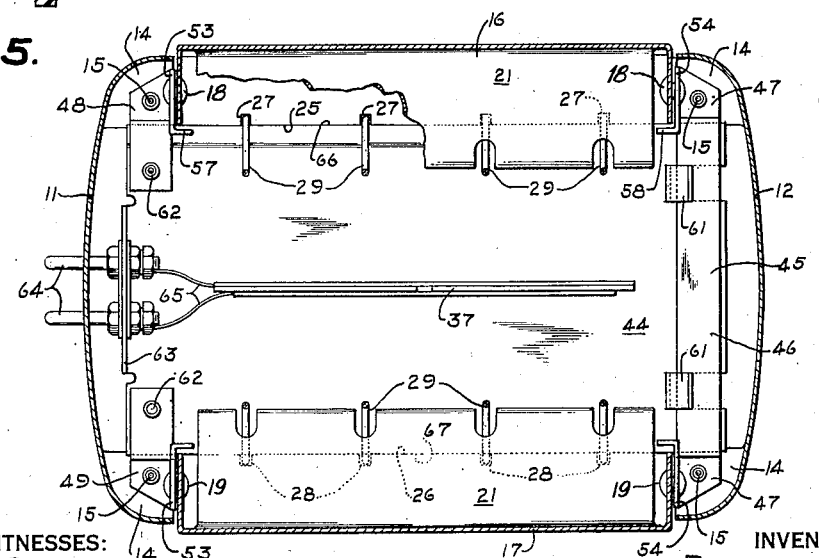
INVENTOR
BERNARD F. PARR
BY
ATTORNEY March 14, 1950     B. F. PARR     2,500,767
ELECTRIC TOASTER
Filed Feb. 6, 1945     2 Sheets-Sheet 2
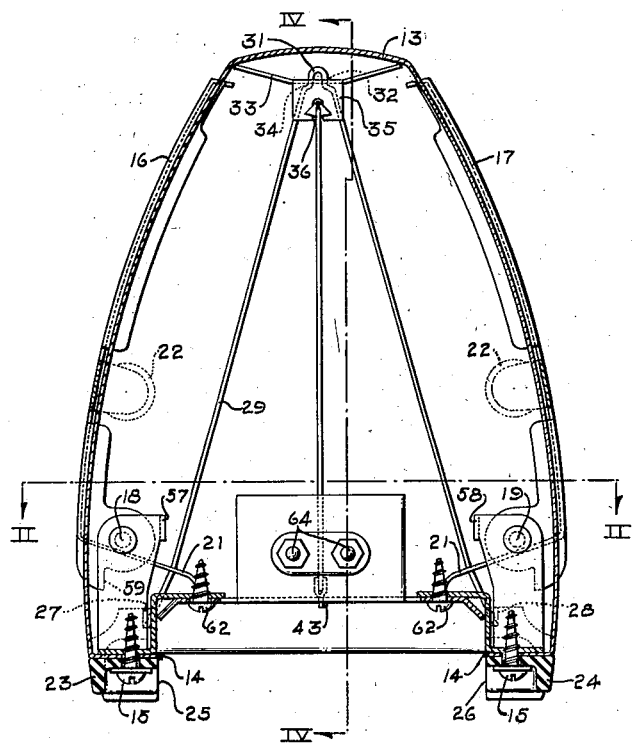
Fig. 3.
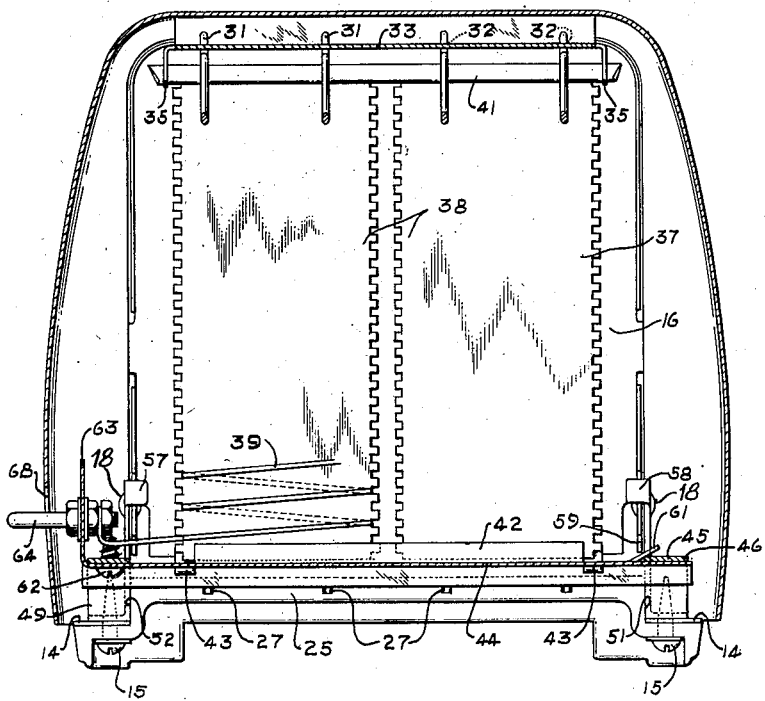
Fig. 4.
INVENTOR
BERNARD F. PARR
BY 
ATTORNEY Patented Mar. 14, 1950

2,500,767

UNITED STATES PATENT OFFICE 2,500,767

ELECTRIC TOASTER

Bernard F. Parr, Mansfield, Ohio, assignor to Westinghouse Electric Corporation, East Pittsburgh, Pa., a corporation of Pennsylvania Application February 6, 1945, Serial No. 576,444

7 Claims. (Cl. 99—385)

My invention relates to electric toasters and has for its object to provide improved apparatus of this kind.

A further object of the invention is to provide an improved toaster structure which may be economically manufactured and readily serviced.

These and other objects are effected by my invention as will be apparent from the following description and claims taken in connection with the accompanying drawings, forming a part of this application, in which:

Fig. 1 is a side elevation of my improved toaster;

Fig. 2 is a section taken along the lines II—II of Figs. 1 and 3, with parts broken away for clearness;

Fig. 3 is a section taken along the line III—III of Fig. 1;

Fig. 4 is a section taken along the line IV—IV of Fig. 3; and

Fig. 5 is a sectional view of a detail and is taken along the line V—V of Fig. 1.

Referring now to the drawings, I have shown my improved toaster construction including a casing 10 of the inverted U shape and having generally vertical leg portions 11 and 12 and a top portion 13 bridging the leg portions. When viewed in cross section, the casing 10 is of bowed construction, the bowing of the top portion 13 being best shown in Fig. 3 while the bowing of the leg portions 11 and 12 is best shown in Fig. 2. The lower corners of each of the leg portions 11 and 12 are provided with webs 14 arranged generally in a horizontal plane and provided with openings for the reception of self-tapping screws 15, to be referred to hereinafter.

The open sides of the U-shaped casing 10 are closed by bread trays or pans 16 and 17 which are of conventional construction and which are movably supported by pivots 18 and 19, the latter being supported in a manner to be described hereinafter. The pans 16 and 17 are provided with the usual inwardly-extending tongues 21 for the support of the bread to be toasted when the pans 16 and 17 are disposed in their toasting positions, as shown in the drawings. Suitable handles 22 are provided on the pans 16 and 17 for actuating the pans between their toasting positions, as shown, to a generally horizontal bread-receiving position.

The casing structure 10 is carried by a supporting structure, including a pair of feet or supporting members 23 and 24, which are spaced apart and which extend longitudinally of the casing 10. The opposed faces 25 and 26, respectively, of the feet 23 and 24 are each provided with spaced notches arranged in opposed relation. The notches in the face 25 are indicated at 27 and the notches in the face 26 are shown at 28. The opposed notches 27 and 28 receive and support a plurality of guard wires of hairpin configuration and indicated at 29. The upper ends or the intermediate portions of the guard wires 29, shown at 31, extend within spaced apertures 32 in an insert or spacer 33 arranged beneath the top portion 13 of the casing.

The guard wires 29 are bent to provide shoulders 34 which engage the underside of the spacer or insert 33 and define the support for the insert 33 within the casing 10. The insert 33 is also provided with a pair of downwardly-extending ears 35 at its ends, which ears 35 have downwardly-facing openings or slots 36 formed therein for supporting the upper end of a flat heating element 37. The heating element 37 is of well-known construction and may include a pair of insulating members formed, for example, of mica and indicated by the reference numerals 38. A heating element 39 is wound upon the insulating supports 38 in any manner well understood in the art.

Preferably, the heating element 37 has a metallic strip 41 crimped on the top edge thereof and it is this strip 41 which is fitted within the notches or slots 36. The bottom of the heating element 37 also has a strip 42 crimped thereon, said strip 42 having downwardly-extending fingers 43 which are received in suitable openings provided in a plate 44, to be referred to more in detail hereinafter. The fingers 43 of strip 42 are preferably twisted or bent to prevent separation of the element 37 and the plate 44 during handling, as is well understood.

A relatively stiff tie member, shown at 45, is disposed within the leg 12 of the casing and rests upon the webs 14 thereof. The tie 45 has an elevated intermediate portion 46 and depressed terminal portions 47 which engage the webs 14. The terminal portions 47 are provided with an opening in which the self-tapping screws 15 are threaded.

At the opposite end of the casing, a pair of brackets 48 and 49 are arranged within the leg 11 of the casing 10, the brackets 48 and 49 being provided with suitable openings for receiving the self-tapping screws 15. These brackets 48 and 49 engage the respective webs 14 associated with the leg 11. It will be apparent from the foregoing that, when the self-tapping screws 15 have been driven home, the feet 23 and 24, the brackets 48 and 49, and the tie member 45 are rigidly secured together. In this connection, the tie member 45 and the brackets 48 and 49 are fitted closely to shoulder portions 51 and 52 which are formed on the feet 23 and 24. Accordingly, any twisting of the assembled structure in a horizontal plane is precluded by the shoulders 51 and 52.

The bracket 48 and the tie member 45 are provided with respective upwardly-extending ears 53 and 54 which support the pivots 18 upon which the bread pan 16 is carried. These ears 53 and 54 may be provided with stop members 57 and 58 which are engageable by shoulders 59 (Fig. 3) formed on the pan 16, whereby the amount of movement of the pan in an opening direction is limited and whereby a support for the pan is defined. The opposite pan 17 is supported by the pivots 19 and its movement is limited by means identical with the means described in connection with the pan 16, so that in the interest of brevity, a detailed description of the support for the pan 17 is deemed unnecessary.

As best shown in Figs. 2 and 4, the plate 44 is supported at one end by a pair of fingers 61 which rest upon the tie member 45, and at its opposite end by a pair of self-tapping screws 62 which are threaded in the brackets 48 and 49. One end of the supporting plate 44 is provided with a vertically-extending bracket 63 which defines a support for a pair of terminals 64, the latter being insulated from the bracket 63. These terminals are electrically connected by leads, shown at 65, to the heating element 39, as is well understood. The terminals 64 extend into an opening 68 in the leg 11 of the casing and formed to receive a conventional attachment plug.

It will be noted that, when the supporting plate 44 is assembled in the casing, its side margins, indicated at 66 and 67, are disposed adjacent the inner faces 25 and 26 of the feet 23 and 24, respectively. These margins 66 and 67 are also aligned with the recesses 27 and 28 and function to prevent the lower terminal portions of the hairpin guard wires 29 from being dislodged out of the recesses 27 and 28.

In assembling the toaster described up to now, the side pans 16 and 17 are fastened, by means of their respective pivots 18 and 19, to the brackets 48 and 49 and the tie 45. This assembly is then slipped within the casing 10, which is, at this time, inverted and disposed in a suitable holding fixture. The two feet 23 and 24 are then placed on the bottom of the casing 10 and the self-tapping screws 15 are threaded into the brackets 48 and 49 and the tie 45, as described. The spacer 33 is next lowered within the inverted casing and disposed in the bowed top portion 13 thereof. The guard wires 29 are then entered through the open bottom of this assembly and the ends 31 of the guard wires are disposed in their respective apertures 32. The legs of the guard wires 29 are then permitted to flex within opposed recesses 27 and 28.

After this operation is completed, the heating element 37 assembled on the plate 44 is then dropped into the inverted casing until the strip 41 at the top of the element enters the notches 36. In inserting the element assembly in the casing and before arranging the strip 41 in the notches 36, it will be necessary to tilt the element structure slightly in order to allow the terminals 64 to enter the opening 68 in the leg 11 of the casing. When the clip 41 of the element is within the notches 36, the element assembly is shifted slightly to the right, as viewed in Fig. 4, in order to dispose the fingers 61 above the portion 46 of the tie 45. The self-tapping screws 62 are then threaded into the brackets 48 and 49 in order to firmly hold the plate 44 and the element 37 in their proper positions. The assembly of the toaster structure is now complete.

From the foregoing description, it will be apparent that I have provided an improved toaster construction which may be economically manufactured and readily serviced. In this connection, the heating element or the guard wires may be easily renewed by removing the screws 62, after which the heating element 37 and its supporting plate 44 with the terminals 64 attached may be lifted through the open bottom of the casing. The heating element 37 may be removed from the plate 44 merely by disconnecting the leads 65 from the terminal 64 and bending the fingers 43 to a position in alignment with the openings in the plate 44. The removal of the plate 44, of course, opens the opposed faces of the recesses 27 and 28 so that the legs of the guard wires may be flexed inwardly slightly and the guard wire removed. The insert 33 may be removed, of course, after all guard wires are removed.

While I have shown my invention in but one form, it will be obvious to those skilled in the art that it is not so limited, but is susceptible of various changes and modifications without departing from the spirit thereof.

What I claim is:

1. In a toaster structure, the combination of a pair of spaced-apart supporting members, each of said members having spaced recesses formed in opposing faces thereof, an inverted U-shaped casing carried by the supporting members and having its top portion spaced thereabove, said top portion being provided on its under surface with spaced downwardly-facing apertures, a plurality of guard wires of hairpin configuration having their upper intermediate portions disposed within said apertures and their lower terminal portions disposed within said recesses, heating means intermediate the legs of the guard wires and a plate below the heating means and extending between the opposed recesses of the supporting members for preventing displacement of said terminal portions of the guard wires from said recesses.

2. In a toaster, the combination of an inverted U-shaped casing, a pair of supporting members spaced apart and having their adjacent ends secured to respective bottom portions of the casing, said members having spaced recesses formed in their opposed faces, an insert arranged beneath the top portion of the casing and having a plurality of spaced apertures therein, a plurality of guard wires of hairpin shape arranged within the casing, the upper intermediate portions of the guard wires being disposed in said apertures and the leg portions of the guard wires being disposed in opposed recesses of the supporting members, a heating element arranged between the legs of the guard wires and a plate supporting the heating element and extending between the supporting members, said plate having its side margins disposed adjacent the lower ends of the legs of the guard wires to prevent displacement thereof from said recesses.

3. In a toaster, the combination of a pair of spaced members defining a support for the toaster, said members having respective groups of spaced recesses formed in the opposed faces thereof, a casing structure of inverted U shape having its ends secured respectively to the adjacent ends of the support members, an insert arranged beneath the top of the casing structure and having a plurality of spaced apertures formed therein, a plurality of guard wires of hairpin configuration arranged within the casing structure and having their top portions disposed, respectively, within said apertures, the lower ends of the guard wires being disposed in said recesses, a heating element arranged within the casing structure, a supporting plate carrying said element, said supporting plate extending between said supporting members, the side margins of the plate being disposed between and adjacent to the lower ends of the guard wires for preventing displacement thereof from said recesses and means for securing said plate to the casing structure.

4. In a toaster, the combination of a base having separated supporting members defining a relatively large space therebetween, said members having respective opposed groups of recesses formed therein and facing said space, a casing of inverted U shape having its ends secured respectively to the adjacent ends of the supporting members, means arranged beneath the upper portion of the casing and having a plurality of spaced downwardly-facing apertures formed therein, a plurality of guard wires of hairpin configuration insertable through said space and having their top portions disposed, respectively, within said downwardly-facing apertures, the ends of the guard wires being disposed in said recesses, a heating element insertable through said space and having a supporting plate for closing a substantial portion of said space and means for supporting said plate with its side margins adjacent the lower ends of said guard wires for preventing displacement thereof from the recesses.

5. In a toaster, the combination of a pair of opposed members forming a support for the toaster, each of said supporting members having a group of spaced recesses formed in the opposed sides thereof, a casing of inverted U shape having its lower ends fixed respectively to the ends of said members, an insert fitting within the top portion of the casing and provided with a group of spaced-apart, downwardly-facing apertures, respective lugs provided on the ends of the insert and each lug having a downwardly-facing notch therein, a plurality of guard wires of hairpin configuration, the upper intermediate portions of which are arranged within said downwardly-facing apertures in the insert and the legs of which are disposed in said opposed recesses in the supporting members, said guard wires defining the support for said insert, a generally flat heating element arranged between the legs of the guard wires and having its upper edge disposed within said notches and a removable plate supporting said element and having its side margins disposed adjacent and within the lower ends of the guard wires for preventing displacement of the guard wires from the recesses.

6. In a toaster structure, the combination of a pair of spaced-apart supporting members, each of said members having spaced recesses formed in opposing faces thereof, an inverted U-shaped casing carried by the supporting members and having its top portion spaced thereabove, said top portion being provided on its under surface with spaced downwardly-facing apertures, a plurality of guard wires of hairpin configuration having their upper intermediate portions disposed within said apertures and their lower terminal portions disposed within said recesses, heating means intermediate the legs of the guard wires and a plate below the heating means and extending between said lower terminal portions of the guard wires for preventing displacement of the guard wires from said recesses.

7. In a toaster structure, the combination of a pair of spaced-apart supporting members, each of said members having spaced recesses formed in opposing faces thereof, an inverted U-shaped casing carried by the supporting members and having its top portion spaced thereabove, a plurality of guard wires of hairpin configuration arranged within the casing, means associated with the top portion of the casing for retaining intermediate portions of the respective guard wires in spaced relation, said guard wires having their lower terminal portions disposed within said recesses, heating means intermediate the legs of the guard wires and a plate below the heating means and extending between said lower terminal portions of the guard wires for preventing displacement of the guard wires from said recesses.

BERNARD F. PARR.

REFERENCES CITED

The following references are of record in the file of this patent:

UNITED STATES PATENTS

| Number | Name | Date |
|---|---|---|
| 1,597,304 | Warner et al. | Aug. 24, 1926 |
| 2,111,417 | Bersted | Mar. 15, 1938 |
| 2,194,848 | Collins | Mar. 26, 1940 |
| 2,326,589 | Weeks | Aug. 10, 1943 |

FOREIGN PATENTS

| Number | Country | Date |
|---|---|---|
| 821,159 | France | Aug. 17, 1937 |